US008805080B2

(12) United States Patent
Sun et al.

(10) Patent No.: US 8,805,080 B2
(45) Date of Patent: Aug. 12, 2014

(54) METHOD OF AND DEVICE FOR IDENTIFYING DIRECTION OF CHARACTERS IN IMAGE BLOCK

(75) Inventors: Jun Sun, Beijing (CN); Satoshi Naoi, Beijing (CN)

(73) Assignee: Fujitsu Limited, Kawasaki-shi (JP)

( * ) Notice: Subject to any disclaimer, the term of this patent is extended or adjusted under 35 U.S.C. 154(b) by 105 days.

(21) Appl. No.: 13/472,790

(22) Filed: May 16, 2012

(65) Prior Publication Data
US 2013/0004077 A1 Jan. 3, 2013

(30) Foreign Application Priority Data
Jun. 29, 2011 (CN) .......................... 2011 1 0189288

(51) Int. Cl.
*G06K 9/62* (2006.01)
(52) U.S. Cl.
USPC ........................... 382/187; 382/216; 382/289
(58) Field of Classification Search
None
See application file for complete search history.

(56) References Cited

U.S. PATENT DOCUMENTS

| | | | |
|---|---|---|---|
| 5,471,549 A | 11/1995 | Kurosu et al. | |
| 6,151,423 A | 11/2000 | Melen | |
| 2004/0161149 A1 | 8/2004 | Kaneda et al. | |
| 2006/0018544 A1* | 1/2006 | Ohguro | 382/181 |
| 2009/0274392 A1 | 11/2009 | Fan et al. | |

FOREIGN PATENT DOCUMENTS

| | | |
|---|---|---|
| CN | 1018336648 | 9/2010 |
| EP | 1703444 A2 | 9/2006 |
| JP | 8-212298 | 8/1996 |
| JP | 10-224600 | 8/1998 |
| JP | 11-39428 | 2/1999 |
| JP | 2000-99628 | 4/2000 |

OTHER PUBLICATIONS

Ranjith Unnikrishnan, et al., "Combined Script and Page Orientation Estimation using the Tesseract OCR engine", Google Inc., Jul. 25, 2009, pp. 1-7.
Extended European Search Report mailed May 13, 2014 in corresponding European Application No. 12167601.9.

* cited by examiner

*Primary Examiner* — Brian P Werner
(74) *Attorney, Agent, or Firm* — Staas & Halsey LLP

(57) ABSTRACT

The present embodiments disclose a method of and device for identifying the direction of characters in an image block. The method includes: performing optical character recognition processing on the image block by assuming various directions as assumed character directions to obtain sub image blocks, recognized characters corresponding to the sub image blocks and correctness measures thereof in each assumed character directions; in sub image blocks in the assumed character directions with 180° mutual relation, searching for a minimum matching pair of the sub image blocks; adjusting the sub image blocks in the searched minimum matching pair to eliminate the effect, on an identification result, of different numbers of sub image blocks in various assumed character directions; calculating an accumulative correctness measure in each assumed character directions based on the adjusted sub image blocks; and identifying the direction of characters in the image block according to the accumulative correctness measures.

15 Claims, 8 Drawing Sheets

OCR recognition result:

| Recognized character | U | P | | A | H | O | V | N | ⌈ |
|---|---|---|---|---|---|---|---|---|---|
| Confidence | 0.54 | 0.36 | | 0.48 | 0.61 | 0.71 | 0.61 | 0.58 | 0.65 |
| Serial number | P1 | P2 | | P3 | P4 | P5 | P6 | P7 | P8 |

OCR recognition result:

| Recognized character | I | N | ᛧ | O | ƞ | | d | n |
|---|---|---|---|---|---|---|---|---|
| Confidence | 0.62 | 0.58 | 0.65 | 0.62 | 0.40 | | 0.50 | 0.61 |
| Serial number | N1 | N2 | N3 | N4 | N5 | | N6 | N7 |

OCR recognition result:

| | | | | | | | |
|---|---|---|---|---|---|---|---|
| Recognized character | U | P | A H | O | V | N | ⌈ |
| Recognition distance | 928 | 1279 | 1034 774 | 578 | 779 | 840 | 695 |
| Serial number | P1 | P2 | P3 P4 | P5 | P6 | P7 | P8 |

OCR recognition result:

| | | | | | | | |
|---|---|---|---|---|---|---|---|
| Recognized character | I | N | ⊤ | O | η | d | n |
| Recognition distance | 759 | 840 | 704 | 769 | 1087 | 1005 | 790 |
| Serial number | N1 | N2 | N3 | N4 | N5 | N6 | N7 |

METHOD OF AND DEVICE FOR IDENTIFYING DIRECTION OF CHARACTERS IN IMAGE BLOCK

This application claims priority to Chinese Patent Application No. 201110189288.8, filed on Jun. 29, 2011 and entitled "Method of and Device for Identifying Direction of Characters in Image Block", contents of which are incorporated herein by reference in its entirety.

FIELD

The present embodiments generally relate to processing of a document image and in particular to a method of and device for identifying the direction of characters in an image block.

BACKGROUND

When a user scans a stack of documents using a scanner or the like, every page of each document is placed upside up for an ideal input. With the documents placed upside up, the user can read the documents easily, and scanned images of the documents can be read by the user without adjusting their directions. However in a practical application, the documents to be scanned by the user tend to be placed alternatively at angles of 0° (upside up) and 180° (upside down) as well as 90° and 270° (transversely). It would be burdensome and time-consuming for the user to check and adjust the placement directions of the documents page-by-page prior to their scanning. Therefore the scanner is designed with a function of judging automatically the direction of a document image. With the function of judging automatically the direction of a document image, the scanned document image can be adjusted to be placed upside up to thereby alleviate the burden on the user and improve the efficiency of usage by the user.

In a traditional method of judging automatically the direction of a document image, a text line in the document image is located; Optical Character Recognition (OCR) processing is performed respectively in four possible directions to obtain recognized characters and corresponding confidences or recognition distances thereof in the four possible directions; and the average confidence or the average recognition distance of the text line is calculated. The direction with the largest average confidence or the smallest average recognition distance is judged as the direction of the text line, and the direction of the document image is further judged from the direction of the text line. The direction of the text line refers to the upside-up direction of the text line, and the direction of the document image refers to the upside-up direction of the document image. Hereinafter, the character direction (or the direction of characters) refers to the upside-up direction of (the) characters.

SUMMARY

The following is the summary of the embodiments to facilitate a basic understanding of some aspects of the embodiments. However it shall be appreciated that this summary is not an extensive overview of the embodiments, and it is intended neither to identify certain crucial or important elements of the embodiments nor to delineate the scope of the embodiments. Rather, the primary purpose of the summary is to present some concepts of the embodiments in a simplified form prior to the more detailed description that is presented hereinafter.

As illustrated in FIG. 1, an image block of a text line "TIP AMOUNT" is input in the assumed 0° direction and is rotated by 180° to obtain an image block of the text line in the 180° direction. Since processes in the directions of 90° and 270° are similar to those in the directions of 0° and 180°, only the processes in the directions of 0° and 180° will be described here as an example. OCR processing is performed respectively on the image blocks of the text line in the directions of 0° and 180° to obtain sub image blocks, recognized characters corresponding to the sub image blocks and confidences thereof in the two directions as illustrated in FIG. 1.

In the traditional method, the average confidence of the recognized characters in the 0° direction equals to (0.54+0.36+0.48+0.61+0.71+0.61+0.58+0.65)/8=0.5675, and the average confidence of the recognized characters in the 180° direction equals to (0.62+0.58+0.65+0.62+0.40+0.50+0.61)/7=0.5686. Since 0.5675 is smaller than 0.5686, the 180° direction (i.e., the direction with the higher average confidence) might be judged in error as the direction of the characters in the image block of the text line in the traditional method.

The foregoing error arises because the image block in the 0° direction is divided into eight sub image blocks while the image block in the 180° direction is divided into seven sub image blocks, and the image blocks before and after rotation correspond to the same character contents, so a consequential error arises from division into different numbers of sub image blocks. Thus, the direction of the characters in the image block is identified in error due to those different numbers of sub blocks.

An object of the embodiments is to address the foregoing problem by proposing a method and device capable of identifying correctly the direction of characters in an image block. This solution can identify correctly the direction of characters in an image block regardless of different numbers of sub blocks resulting from OCR processing to thereby improve the accuracy of judging automatically the direction of a document image.

In order to attain the foregoing object, there is provided according to an aspect of the embodiments a method of identifying the direction of characters in an image block, which includes: performing optical character recognition processing on the image block by assuming various directions as assumed character directions, respectively, to obtain sub image blocks, recognized characters corresponding to the sub image blocks and correctness measures thereof in each of the assumed character directions; in sub image blocks in the assumed character directions with a 180° mutual relation therebetween, searching for a minimum matching pair of the sub image blocks, wherein the minimum matching pair is two sets of sub image blocks in the assumed character directions with a 180° mutual relation therebetween, which have corresponding positions, identical sizes and a minimum number of sub image blocks; adjusting the sub image blocks in the searched minimum matching pair, to eliminate the effect, on an identification result, of different numbers of sub image blocks in the various assumed character directions; calculating an accumulative correctness measure in each of the assumed character directions based on the adjusted sub image blocks; and identifying the direction of the characters in the image block according to the accumulative correctness measures.

According to an embodiment, the step of adjusting the sub image blocks in the searched minimum matching pair includes: when M sub image blocks in a assumed character direction in a minimum matching pair correspond to N sub image blocks in the other assumed character direction in the minimum matching pair and M≠N, adjusting the correctness measures corresponding to the sub image blocks, wherein M and N are positive integers.

According to an embodiment, the step of adjusting the sub image blocks in the searched minimum matching pair includes: when M sub image blocks in a assumed character direction in a minimum matching pair correspond to N sub image blocks in the other assumed character direction in the minimum matching pair and M≠N, adjusting the number of sub image blocks so that the numbers of sub image blocks in the two assumed character directions in the minimum matching pair are identical, wherein M and N are positive integers.

According to an embodiment, the step of adjusting the correctness measures corresponding to the sub image blocks includes the steps of: multiplying the correctness measures of the M sub image blocks by C/M, and multiplying the correctness measures of the N sub image blocks by C/N, wherein C is the least common multiple of M and N; or, multiplying the correctness measures of the M sub image blocks by N, and multiplying the correctness measures of the N sub image blocks by M.

According to an embodiment, the step of adjusting the correctness measures corresponding to the sub image blocks includes the step of: dividing the correctness measures of the M sub image blocks by M, and dividing the correctness measures of the N sub image blocks by N.

According to an embodiment, the step of adjusting the correctness measures corresponding to the sub image blocks includes the step of: multiplying the correctness measures of the M sub image blocks by N/M.

According to an embodiment, the step of adjusting the number of sub image blocks so that the numbers of sub image blocks in the two assumed character directions in the minimum matching pair are identical includes the step of: duplicating each of the M sub image blocks into C/M ones, and duplicating each of the N sub image blocks into C/N ones, where C is the least common multiple of M and N; or, duplicating each of the M sub image blocks into N ones, and duplicating each of the N sub image blocks into M ones.

According to an embodiment, the step of adjusting the number of sub image blocks so that the numbers of sub image blocks in the two assumed character directions in the minimum matching pair are identical includes the step of: merging the M sub image blocks into N new sub image blocks, wherein a sum of correctness measures of the N new sub image blocks is a sum of correctness measures of the M sub image blocks multiplied by N/M.

According to an embodiment, the step of adjusting the number of sub image blocks so that the numbers of sub image blocks in the two assumed character directions in the minimum matching pair are identical includes the step of: merging the M sub image blocks into a new sub image block, wherein a correctness measure of the new sub image block is an arithmetic average value of the correctness measures of the M sub image blocks; and, merging the N sub image blocks into another new sub image block, wherein a correctness measure of the other new sub image block is an arithmetic average value of the correctness measures of the N sub image blocks.

According to an embodiment, the step of calculating an accumulative correctness measure in each of the assumed character directions based on the adjusted sub image blocks includes the step of: dividing the sums of the correctness measures of the adjusted sub image blocks in each of the assumed character directions by the number of the minimum matching pairs in the corresponding assumed character directions as the accumulative correctness measures in the corresponding assumed character directions.

According to an embodiment, the correctness measure includes a confidence or a recognition distance, and the various directions include two transverse directions and two longitudinal directions of the image block.

According to another aspect of the embodiments, there is provided a device for identifying the direction of characters in an image block, which includes: an optical character recognition processing unit configured for performing optical character recognition processing on the image block by assuming various directions as assumed character directions, respectively, to obtain sub image blocks, recognized characters corresponding to the sub image blocks and correctness measures thereof in each of the assumed character directions; a minimum matching pair searching unit configured for, in sub image blocks in the assumed character directions with a 180° mutual relation therebetween, searching for a minimum matching pair of the sub image blocks, wherein the minimum matching pair is two sets of sub image blocks in the assumed character directions with a 180° mutual relation therebetween, which have corresponding positions, identical sizes and a minimum number of sub image blocks; a sub image block adjusting unit configured for adjusting the sub image blocks in the searched minimum matching pair, to eliminate the effect, on an identification result, of different numbers of sub image blocks in the various assumed character directions; an accumulative correctness measure calculating unit configured for calculating an accumulative correctness measure in each of the assumed character directions based on the adjusted sub image blocks; and a character direction identifying unit configured for identifying the direction of the characters in the image block according to the accumulative correctness measures.

According to an embodiment, the sub image block adjusting unit includes: a sub image block correctness measure adjusting unit configured for, when M sub image blocks in a assumed character direction in a minimum matching pair correspond to N sub image blocks in the other assumed character direction in the minimum matching pair and M≠N, adjusting the correctness measures corresponding to the sub image blocks, wherein M and N are positive integers.

According to an embodiment, the sub image block adjusting unit includes: a sub image block number adjusting unit configured for, when M sub image blocks in a assumed character direction in a minimum matching pair correspond to N sub image blocks in the other assumed character direction in the minimum matching pair and M≠N, adjusting the number of sub image blocks so that the numbers of sub image blocks in the two assumed character directions in the minimum matching pair are identical, wherein M and N are positive integers.

According to an embodiment, the accumulative correctness measure calculating unit is configured for dividing the sums of the correctness measures of the adjusted sub image blocks in each of the assumed character directions by the number of the minimum matching pairs in the corresponding assumed character directions as the accumulative correctness measures in the corresponding assumed character directions.

Furthermore, there is provided according to another aspect of the embodiments a storage medium including machine readable program codes which when being executed on an information processing device cause the information processing device to perform the foregoing method according to the embodiments.

Moreover, there is provided according to yet another aspect of the embodiments a program product including machine executable instructions which when being executed on an information processing device cause the information processing device to perform the foregoing method according to the embodiments.

BRIEF DESCRIPTION OF THE DRAWINGS

The foregoing and other objects, features and advantages of the embodiments will become more apparent from the detailed description given below in conjunction with the accompanying drawings in which those components are merely intended to illustrate the principle of the embodiments and throughout which identical or like technical features or components are denoted with identical or like reference numerals. In the drawings.

DETAILED DESCRIPTION

Figure 1:
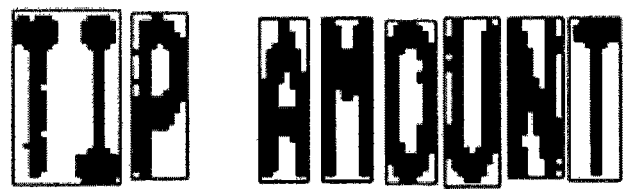
FIG. 1 illustrates sub image blocks, recognized characters and confidences in the directions of 0° and 180° resulting from OCR processing of an image block of a text line.
Figure 1:
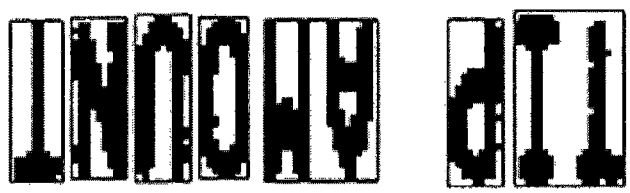

Exemplary embodiments will be described below in conjunction with the accompanying drawings. For the sake of clarity and conciseness, not all the features of practical implementations will be described in the specification. However, it shall be appreciated that during developing any of such practical implementations, numerous implementation-specific decisions shall be made to achieve the developer's specific goals, for example, to comply with those system- and business-related constraining conditions which may vary from one implementation to another. Moreover, it shall also be appreciated that such a development job might be very complex and time-consuming but may simply be a routine task for those skilled in the art benefiting from this disclosure.

It shall further be noted that only those device structures and/or process steps closely relevant to the solutions of the embodiments will be illustrated in the drawings while other details less relevant to the embodiments are omitted so as not to obscure the embodiments due to those unnecessary details. Furthermore, it shall further be noted that an element and a feature described in one of the drawings or implementations of the embodiments can be combined with an element and a feature illustrated in one or more other drawings or implementations.

A flow of a method of identifying the direction of characters in an image block according to embodiments will be described below with reference to FIG. 3 to FIG. 6.

As assumed in this context, a text line has been located in a document image, and an image block containing the text line has been cropped from the document image. The embodiments are focused not upon how to locate the text line in the document image but upon how to identify correctly the direction of characters in the image block containing the text line.

It is typical to assume four main directions as assumed character directions, i.e., the direction of an image block itself (the 0° direction), the direction of the image block rotated by 180°, the direction of the image block rotated by 90° and the direction of the image block rotated by 270°, also referred to as two transverse directions and two longitudinal directions of the image block. The directions of 90° and 270° generally apply to possibly vertically written characters, e.g., of Chinese, Japanese, etc. Since a scenario with the directions of 0° and 180° is similar to a scenario with the directions of 90° and 270°, only the scenario with the directions of 0° and 180° will be described below as an example.

Figure 3:
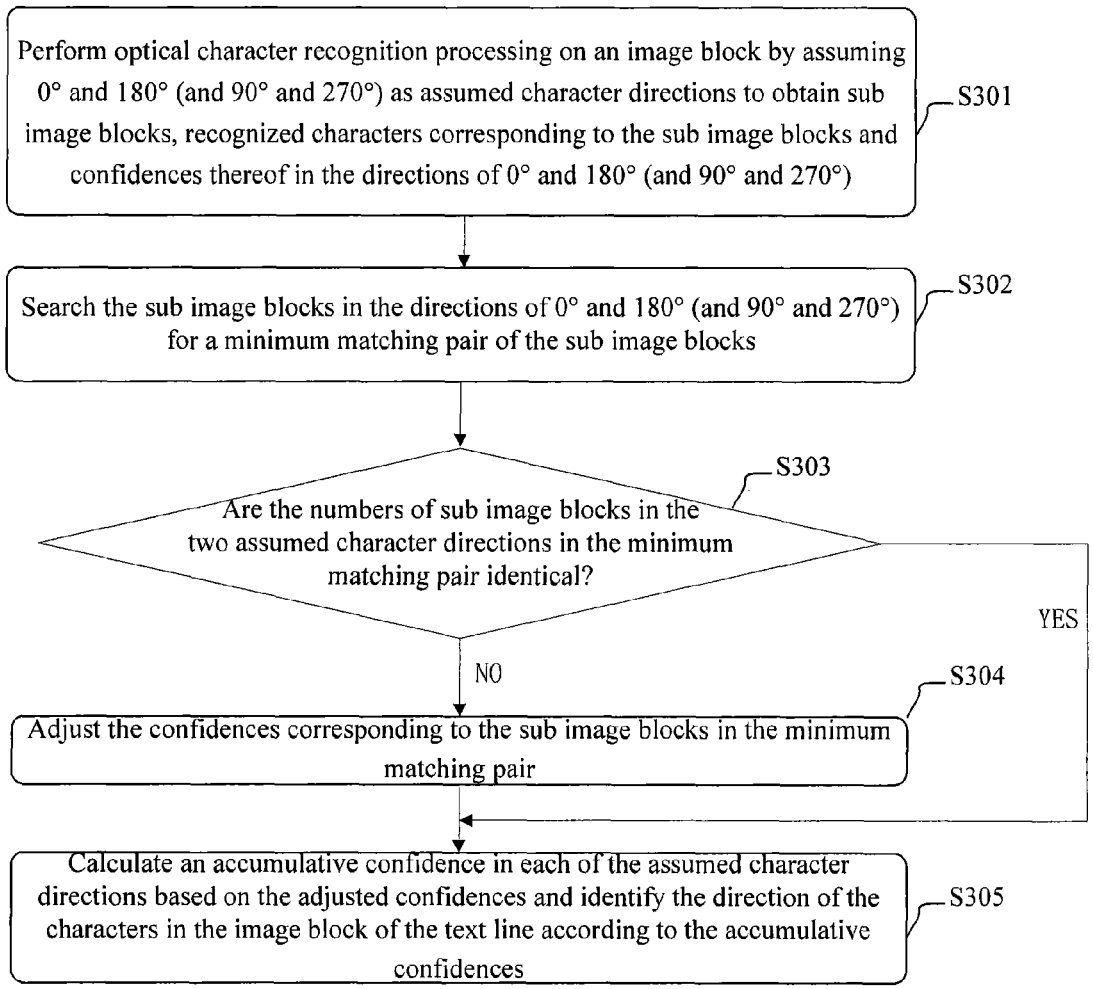
FIG. 3 illustrates a flow chart of a method of identifying the direction of characters in an image block according to a first embodiment.

A flow of a method of identifying the direction of characters in an image block according to the first embodiment will be described below with reference to FIG. 3.

Firstly, OCR processing is performed by optical character recognition processing unit on an image block by assuming 0° and 180° as assumed character directions to obtain sub image blocks, recognized characters corresponding to the sub image blocks and confidences thereof in the directions of 0° and 180° (at S301). FIG. 1 illustrates an example of the sub image blocks which are numbered, the recognized characters and the confidences in the directions of 0° and 180°. A recognition result of OCR generally includes sub image blocks divided from the image block subjected to the OCR, recognized characters corresponding to the sub image blocks and correctness measures of the recognized characters. A correctness measure reflects the reliability of a recognized character and is typically a confidence or a recognition distance. The higher the confidence is, the higher possibility the recognized character is correct; and the shorter the recognition distance is, the higher possibility the recognized character is correct. A description will be presented in the first and second embodiments taking as an example a recognition result including a confidence. A description will be presented in the third and fourth embodiments with respect to a situation in which a recognition result includes a recognition distance.

Next, the sub image blocks in the directions of 0° and 180° are searched by minimum matching pair searching unit for a minimum matching pair of the sub image blocks (at S302). The minimum matching pair refers to two sets of sub image blocks in assumed character directions with a 180° mutual relation therebetween, which have corresponding positions, identical sizes and a minimum number of sub image blocks. The minimum matching pair includes such two sets of sub image blocks that the sub image blocks included in the two sets of sub image blocks are located respectively in two assumed character directions with a 180° mutual relation therebetween and the two sets of sub image blocks have corresponding positions and identical sizes, that is, any one of the two sets of sub image blocks, after being rotated by 180° along with the text line in which it is located, will superimpose upon the other set of sub image blocks belonging to the same minimum matching pair. When the two sets of sub image blocks include a minimum number of sub image blocks, the two sets of sub image blocks are referred to as constituting a minimum matching pair. For example, P1 and N7 constitute a minimum matching pair in FIG. 1. Similarly, P2 and N6, P3 and P4 together with N5, P5 and N4, P6 and N3, P7 and N2, and P8 and N1 constitute respectively a minimum matching pair. There are numerous methods of searching for a minimum matching pair, for example, it is possible to search for a minimum matching pair sequentially from corresponding sides of the two directions according to the definition of a minimum matching pair. Specifically, the first sub image blocks P1 and N7 are located respectively at the leftmost side of the 0° direction and the rightmost side of the 180° direction, and the two sub image blocks are judged as being of the same size, so P1 and N7 are determined as a minimum matching pair. Then the next sub image blocks P2 and N6 are further located in the two directions, and the two sub image blocks are judged as being of the same size, so P2 and N6 are determined as a minimum matching pair. Thereafter the next sub image blocks P3 and N5 are further located in the two directions, and the two sub image blocks are judged as being of different sizes, and then ,according to the definition of a minimum matching pair, the sub image block P4 is further located in the 0° direction of the smaller sub image block P3, a set of sub image blocks including the sub image blocks P3 and P4 are compared with a set of sub image blocks including the sub image block N5 in size, and the two sets of sub image blocks are judged as being of the same size, so the set of sub image blocks including the sub image blocks P3 and P4 and the set of sub image blocks including the sub image block N5 are determined as a minimum matching pair. This process is repeated until locating all the minimum matching pairs in the two assumed character directions with a 180° mutual relationship therebetween.

As described above, the error arises because the image block in the assumed character directions with a 180° mutual relationship therebetween is divided into different numbers of sub image blocks after OCR processing. The minimum matching pairs located at S302 can be considered as a result of further combination of the image blocks of the text line. Since a minimum matching pair includes two sets of sub image blocks of the same size and at corresponding locations, the division of minimum matching pairs is surely correct and the two sets of sub image blocks of the minimum matching pair correspond to the same character contents. Correspondingly, at the level of a minimum matching pair, if the two sets of sub image blocks in the two directions in the minimum matching pair include the same number of sub image blocks, then the direction of the text line will not be judged in error due to inconsistent results of division, which is similar to the situation at the level of the text line. If the two sets of sub image blocks in the two directions in the minimum matching pair include different numbers of sub image blocks, then such results of division may result in incorrect judgment of the direction of the text line. In other words, the root of the problem to be addressed by the embodiments lies in different numbers of divided-into sub image blocks resulting from OCR processing of the same character contents in the different directions. Different numbers of sub image blocks included in the image block of the text line in the two different directions at the level of the text line are translated into different numbers of sub image blocks included in the sets of the sub image blocks in the two different directions at the level of a minimum matching pair through searching for the minimum matching pair.

Therefore, it is determined by sub image block correctness measure adjusting unit whether the numbers of sub image blocks in the two assumed character directions in the minimum matching pair are identical at S303. If so, then it indicates no inconsistent division has occurred and the flow goes to S305 for subsequent processing without any adjustment; otherwise, the flow goes to S304 of adjusting by sub image block correctness measure adjusting unit the confidences corresponding to the sub image blocks in the minimum matching pair.

The confidences corresponding to the sub image blocks in the minimum matching pair are adjusted in order to eliminate the effect, on an identification result, of different numbers of sub image blocks in the respective assumed character directions. There are numerous specific approaches. Here, several illustrative implementations thereof will be presented. It is assumed here that M sub image blocks in one of the assumed character directions in the minimum matching pair correspond to N sub image blocks in the other assumed character direction in the minimum matching pair, where M and N are positive integers. As noted above, M=N indicates a correct division result of the sub image blocks and no adjustment is required. Therefore, the correctness measures corresponding to the sub image blocks will be adjusted only for the situation in which M≠N. In this embodiment, the correctness measure is a confidence.

In a first approach, the confidences of the M sub image blocks are multiplied by N, and the confidences of the N sub image blocks are multiplied by M.

As illustrated in FIG. 1, there are different numbers of sub image blocks in the two directions only in the minimum matching pair including P3 and P4 together with N5, where M=2 and N=1. The confidences of both P3 and P4 are multiplied by 1, and the confidence of N5 is multiplied by 2 as a new confidence of N5, that is, the adjusted confidence corresponding to N5 is 0.40*2=0.80.

In a second approach, each of the confidences of the M sub image blocks is multiplied by C/M, and each of the confidences of the N sub image blocks is multiplied by C/N, where C is the least common multiple of M and N.

In the example of FIG. 1, M and N are relatively prime numbers. With M=4 and N=3, the correctness measures of the M sub image blocks can be multiplied by N and the correctness measures of the N sub image blocks can be multiplied by M in the first approach. However, it will be apparently preferable to alternatively calculate the least common multiple C of M and N and multiply the correctness measures of the M sub image blocks by C/M and multiply the correctness measures of the N sub image blocks by C/N.

In a third approach, each of the confidences of the M sub image blocks is divided by M, and each of the confidences of the N sub image blocks is divided by N.

As illustrated in FIG. 1, there are different numbers of sub image blocks in the two directions only in the minimum matching pair including P3 and P4 together with N5, where M=2 and N=1. The confidences of both P3 and P4 are divided by 2 as new confidences of P3 and P4, that is, the adjusted confidences corresponding to P3 and P4 are 0.24 and 0.305 respectively, and the confidence of N5 is divided by 1 as a new confidence of N5.

In a fourth approach, the confidences of the M sub image blocks are multiplied by N/M.

As illustrated in FIG. 1, there are different numbers of sub image blocks in the two directions only in the minimum matching pair including P3 and P4 together with N5, where M=2 and N=1. The confidences of both P3 and P4 are multiplied by ½ as new confidences of P3 and P4, that is, the adjusted confidences corresponding to P3 and P4 are 0.24 and 0.305 respectively, and the confidence of N5 is divided by 1 as a new confidence of N5.

After the confidences of the minimum matching pair which includes different numbers of sub image blocks in the sets of sub image blocks in the two directions thereof are adjusted by sub image block correctness measure adjusting unit at S304, the adjusted confidences are obtained, and the flow goes to S305 of calculating by accumulative correctness measure calculating unit an accumulative confidence in each of the assumed character directions based on the adjusted confidences and identifying by character direction identifying unit the direction of the characters in the image block of the text line according to the accumulative confidences.

An accumulative confidence is a correctness measure characterizing an recognition result of the image block of the text line in a direction as a whole. An accumulative confidence is generally calculated in two specific approaches. The sum of confidences corresponding to each of sub image blocks in an assumed character direction can be calculated as an accumulative confidence in that direction. Alternatively, the arithmetic average value of confidences corresponding to each of sub image blocks in an assumed character direction can be calculated as an accumulative confidence in that direction. A direction with a higher accumulative confidence is more likely to be a correct identification result.

At S304, the effect, on an identification result, of different numbers of sub image blocks in the respective assumed character directions is eliminated by adjusting the confidences of the sub image blocks in the minimum matching pair so that the confidences of the two sets of sub image blocks as a whole in the minimum matching pair have better comparability in all the first to fourth approaches. For an accumulative confidence which is the calculated sum of confidences, the confidences in the direction with a smaller number of sub image blocks are increased or the confidences in the direction with a larger number of sub image blocks are decreased so that the accumulative confidences in the two directions (the sums of the confidences in the respective directions) have higher reliability. For an accumulative confidence which is the calculated average of confidences, the sum of confidences which is the numerator is equivalently adjusted, and apparently if there are different denominators to calculate the accumulative confidences in the two directions, then the different denominators still reflect the different numbers of sub image blocks in the respective assumed character directions and thereby bring a negative effect upon an identification result. Therefore, in the first embodiment a consistent denominator shall be kept to calculate the arithmetic average value of confidences as an accumulative confidence. The number of unadjusted sub image blocks in any direction can be taken, e.g., 7 or 8 in the example as illustrated in FIG. 1. Preferably, the number of minimum matching pairs in an assumed character direction is taken, which physically means that sets of sub image blocks in a minimum matching pair are taken as an elementary unit of a result of dividing the image block of the text line and the apparent confidences of the two sets of sub image blocks as a whole in the minimum matching pair are adjusted. Apparently, it is preferable here to take the number of minimum matching pairs as the denominator to calculate the average of confidences.

Apparently the one with the highest accumulative confidence among the respective assumed character directions shall be judged as the direction of a correct identification result.

In an example where an accumulative confidence is the sum of all confidences in an assumed character direction, the accumulative confidences calculated in the first to fourth approaches at S304 are respectively:

In the first approach:
Accumulative confidence in the 0° direction=0.54+0.36+ 0.48+0.61+0.71+0.61+0.58+0.65=4.54

Accumulative confidence in the 180° direction=0.62+ 0.58+0.65+0.62+0.80+0.50+0.61=4.38

In the second approach:
Accumulative confidence in the 0° direction=0.54+0.36+ 0.48+0.61+0.71+0.61+0.58+0.65=4.54

Accumulative confidence in the 180° direction=0.62+ 0.58+0.65+0.62+0.80+0.50+0.61=4.38

In the third approach:
Accumulative confidence in the 0° direction=0.54+0.36+ 0.24+0.305+0.71+0.61+0.58+0.65=3.995

Accumulative confidence in the 180° direction=0.62+ 0.58+0.65+0.62+0.40+0.50+0.61=3.98

In the fourth approach:
Accumulative confidence in the 0° direction=0.54+0.36+ 0.24+0.305+0.71+0.61+0.58+0.65=3.995

Accumulative confidence in the 180° direction=0.62+ 0.58+0.65+0.62+0.40+0.50+0.61=3.98

Apparently, the accumulative confidence in the 0° direction is always higher than the accumulative confidence in the 180° direction after the confidences are adjusted in the four approaches. If the average of confidences is calculated through division by 7, i.e., the number of minimum matching pairs, then apparently the accumulative confidence in the 0° direction will also be always higher than the accumulative confidence in the 180° direction. Therefore, the effect, on an identification result, of different numbers of sub image blocks in the respective assumed character directions can be eliminated.

Figure 4:
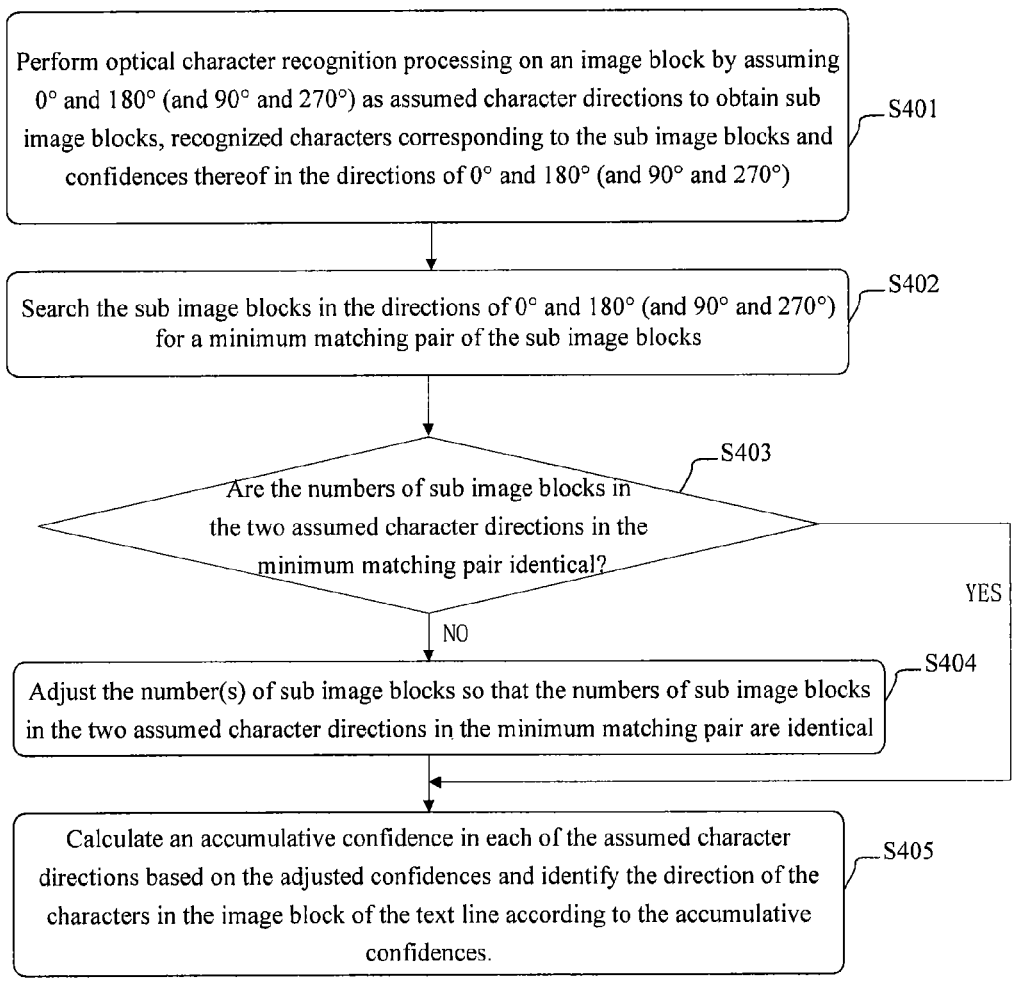
FIG. 4 illustrates a flow chart of a method of identifying the direction of characters in an image block according to a second embodiment.

A flow of a method of identifying the direction of characters in an image block according to the second embodiment will be described below with reference to FIG. 4.

S401 to S403 and S405 are the same respectively as S301 to S303 and S305 of the first embodiment above, and therefore a repeated description thereof will be omitted here. A major difference of the second embodiment from the first embodiment lies in that the numbers of sub image blocks in the two sets of sub image blocks in the minimum matching pair are adjusted so that the numbers of sub image blocks in the two sets of sub image blocks are identical.

As described above, the error arises because the image block in the assumed character directions with a 180° mutual relationship therebetween is divided into different numbers of sub image blocks after OCR processing. Different numbers of sub image blocks included in the image block of the text line in the two different directions at the level of the text line are translated into different numbers of sub image blocks included in the sets of sub image blocks in the two different directions at the level of a minimum matching pair through searching for the minimum matching pairs at S402. In the first embodiment, the apparent confidences of the sets of sub image blocks as a whole in the two directions in the minimum matching pair are adjusted, but there are still different numbers of divided-into sub image blocks in the respective assumed character directions, so the average of confidences is calculated by taking preferably the number of minimum matching pairs as the numerator or taking another numerator of an identical value to thereby derive a correct identification result. Since the root of the problem lies in different numbers of sub image blocks in the sets of sub image blocks in the two directions in the minimum matching pair, the inventors have realized that the technical problem to be addressed by the embodiments can be addressed by adjusting the number of sub image blocks in the two assumed character directions in the minimum matching pair to be identical.

At S404, the numbers of sub image blocks in the minimum matching pair are adjusted so that the numbers of sub image blocks in the two assumed character directions in the minimum matching pair are identical to eliminate the effect, on an identification result, of different numbers of sub image blocks in the respective assumed character directions. There are numerous specific approaches. Here, several illustrative implementations thereof will be presented. It is assumed here that M sub image blocks in one of the assumed character directions in the minimum matching pair correspond to N sub image blocks in the other assumed character direction in the minimum matching pair, where M and N are positive integers. As noted above, M=N indicates a correct division result of the sub image blocks and no adjustment is required. Therefore, the correctness measures corresponding to the sub image blocks will be adjusted only for situation in which M≠N. In this embodiment, the correctness measure is a confidence.

In a first approach, each of the M sub image blocks is duplicated into N ones, and each of the N sub image blocks is duplicated into M ones.

It shall be noted that duplication means that each sub image block to be duplicated is duplicated M or N times into M or N identical duplicated sub image blocks without changing the confidence of the sub image blocks. Moreover, duplication here is primarily for the purpose of judging a correct character direction but does not means occurrence of a plurality of identical duplicated characters among the recognized characters corresponding to the text line.

As illustrated in FIG. 1, there are different numbers of sub image blocks in the two directions only in the minimum matching pair including P3 and P4 together with N5, where M=2 and N=1. N5 is duplicated into two ones so that there are two sub image blocks N5 in the 180° direction and the confidence of each N5 is 0.4.

In a second approach, each of the M sub image blocks is duplicated into C/M ones, and each of the N sub image blocks is duplicated into C/N ones, where C is the least common multiple of M and N.

In the example illustrated in FIG. 1, M and N are relatively prime numbers. With M=4 and N=6, each of the M sub image blocks is duplicated into N ones, and each of the N sub image blocks is duplicated into M ones in the first approach. However, it will be apparently preferable to alternatively calculate the least common multiple C of M and N and duplicate each of the M sub image blocks into C/M ones and duplicate each of the N sub image blocks into C/N ones. For example, C=12 given M=4 and N=6, so each of the four sub image blocks is duplicated into three ones and each of the six sub image blocks is duplicated into two ones.

In a third approach, the M sub image blocks are merged into N new sub image blocks, and the sum of the confidences of the N new sub image blocks is the sum of the confidences of the M sub image blocks multiplied by N/M.

As illustrated in FIG. 1, there are different numbers of sub image blocks in the two directions only in the minimum matching pair including P3 and P4 together with N5, where M=2 and N=1. P3 and P4 are merged into a new sub image block P34 with a confidence being the sum of the confidences corresponding to P3 and P4 divided by 2, i.e., (0.48+0.61)/2=0.545.

The third approach will not be limited to any specific implementation. For example, assuming M>N, a number (M−N+1) of immediately adjacent sub image blocks among the M sub image blocks can be merged into a new sub image block without charging the remaining (N−1) sub image blocks themselves, and the confidences of the respective resulting N sub image blocks can be set to the average value of the confidences of the original M sub image blocks. Apparently, other sub image block merging approaches and other confidence adjusting approaches can alternatively be adopted so long as such two conditions are satisfied that "the M sub image blocks are merged into N new sub image blocks" and "the sum of the confidences of the N new sub image blocks is the sum of the confidences of the M sub image blocks multiplied by N/M". The new N sub image blocks satisfying the two conditions are consistent with the corresponding assumed character direction in terms of the number of sub image blocks and possess adjusted confidences with better comparability. Thus, there is no incorrect judgment of the direction of the text line due to inconsistent division results.

In a fourth approach, the M sub image blocks are merged into a new sub image block with a confidence being the arithmetic average value of the confidences of the M sub image blocks; and the N sub image blocks are merged into another new sub image block with a confidence being the arithmetic average value of the confidences of the N sub image blocks.

As illustrated in FIG. 1, there are different numbers of sub image blocks in the two directions only in the minimum matching pair including P3 and P4 together with N5, where M=2 and N1=1. P3 and P4 are merged into a new sub image block P34 with a confidence being the arithmetic average value of the confidences of P3 and P4, i.e., (0.48+0.61)/2=0.545. N5 is not changed due to N=1.

At S404, the sub image blocks are duplicated or merged by sub image block number adjusting unit so that the sets of sub image blocks in the two directions of the minimum matching pair include the same number of sub image blocks, and the apparent confidences of the minimum matching pair as a whole are also adjusted along with duplicating or merging of the sub image blocks. Thereafter, the flow goes to S405 of calculating by accumulative correctness measure calculating unit an accumulative confidence in each of the assumed character directions based on the adjusted sub image blocks and identifying by character direction identifying unit the direction of the characters in the image block of the text line according to the accumulative confidences.

At S404, the effect, on an identification result, of different numbers of sub image blocks in the respective assumed character directions is eliminated by performing duplicating or merging in order for the same number of sub image blocks in the two directions in the minimum matching pair so that the confidences in the two directions have better comparability in all the first to fourth approaches. For an accumulative confidence which is the calculated sum of confidences, duplicating or merging is performed so that the accumulative confidences in the two directions (the sums of the confidences in the respective directions) have higher reliability. For an accumulative confidence which is the calculated average of confidences, the sum of confidences which is the numerator is equivalently adjusted, and further to the first embodiment, the numbers of sub image blocks are also adjusted to be consistent, so the number of the adjusted sub image blocks can be taken as the denominator to calculate the average of confidences. Alike, the number of minimum matching pairs in an assumed character direction can still be taken as the denominator. Similarly, among the various assumed character directions, the assumed character direction with the highest accumulative confidence shall be judged as the direction of a correct identification result.

In an example where an accumulative confidence is the sum of all confidences in an assumed character direction, the accumulative confidences calculated in the first to fourth approaches at 404 are respectively:

In the first approach:
Accumulative confidence in the 0° direction=0.54+0.36+0.48+0.61+0.71+0.61+0.58+0.65=4.54

Accumulative confidence in the 180° direction=0.62+ 0.58+0.65+0.62+0.40+0.40+0.50+0.61=4.38

In the second approach:

Accumulative confidence in the 0° direction=0.54+0.36+ 0.48+0.61+0.71+0.61+0.58+0.65=4.54

Accumulative confidence in the 180° direction=0.62+ 0.58+0.65+0.62+0.40+0.40+0.50+0.61=4.38

In the third approach:

Accumulative confidence in the 0° direction=0.54+0.36+ 0.545+0.71+0.61+0.58+0.65=3.995

Accumulative confidence in the 180° direction=0.62+ 0.58+0.65+0.62+0.40+0.50+0.61=3.98

In the fourth approach:

Accumulative confidence in the 0° direction=0.54+0.36+ 0.545+0.71+0.61+0.58+0.65=3.995

Accumulative confidence in the 180° direction=0.62+ 0.58+0.65+0.62+0.40+0.50+0.61=3.98

Apparently, the accumulative confidence in the 0° direction is always higher than the accumulative confidence in the 180° direction after the sub image blocks are duplicated or merged in the four approaches. If the average of confidences is calculated through division by 7, i.e., the number of minimum matching pairs or by the number of adjusted sub image blocks, then apparently the accumulative confidence in the 0° direction will still be always higher than the accumulative confidence in the 180° direction. Therefore, the effect, on an identification result, of different numbers of sub image blocks in the respective assumed character directions can be eliminated.

Figure 5:
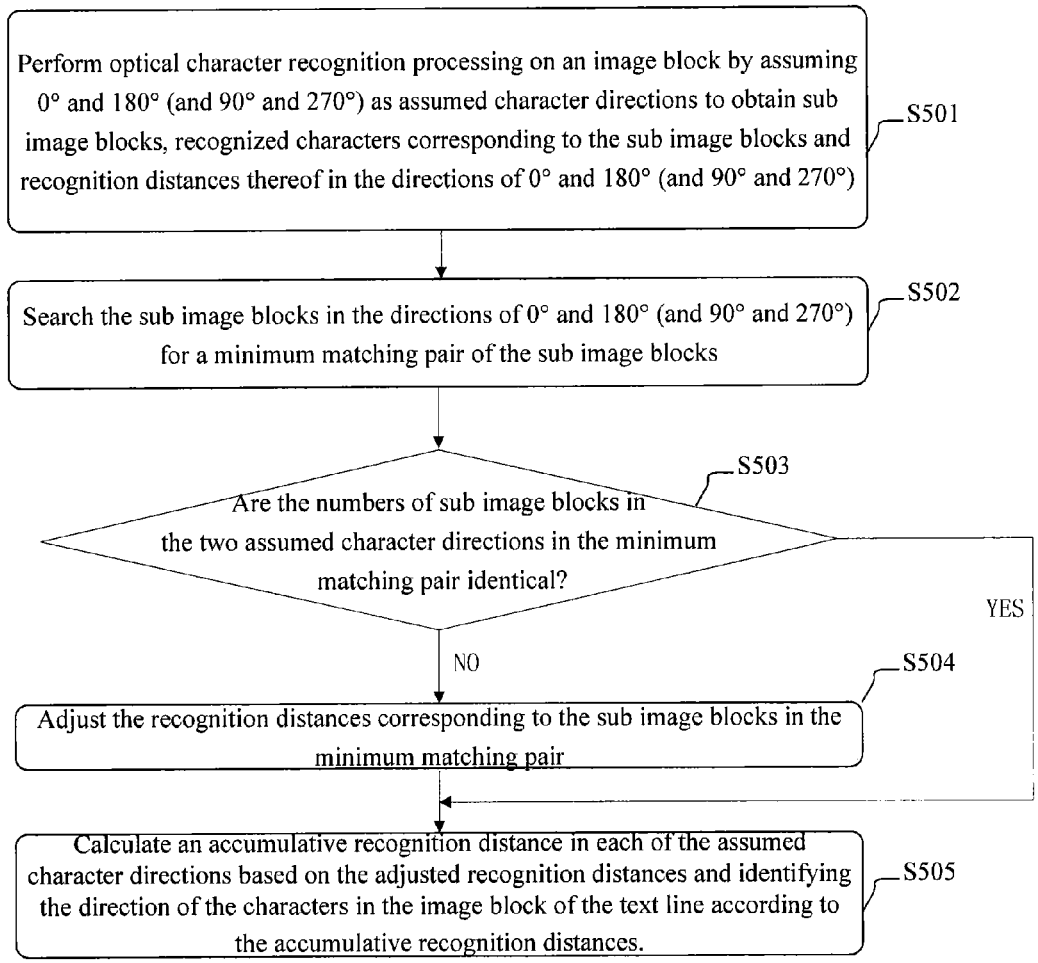
FIG. 5 illustrates a flow chart of a method of identifying the direction of characters in an image block according to a third embodiment.
Figure 6:
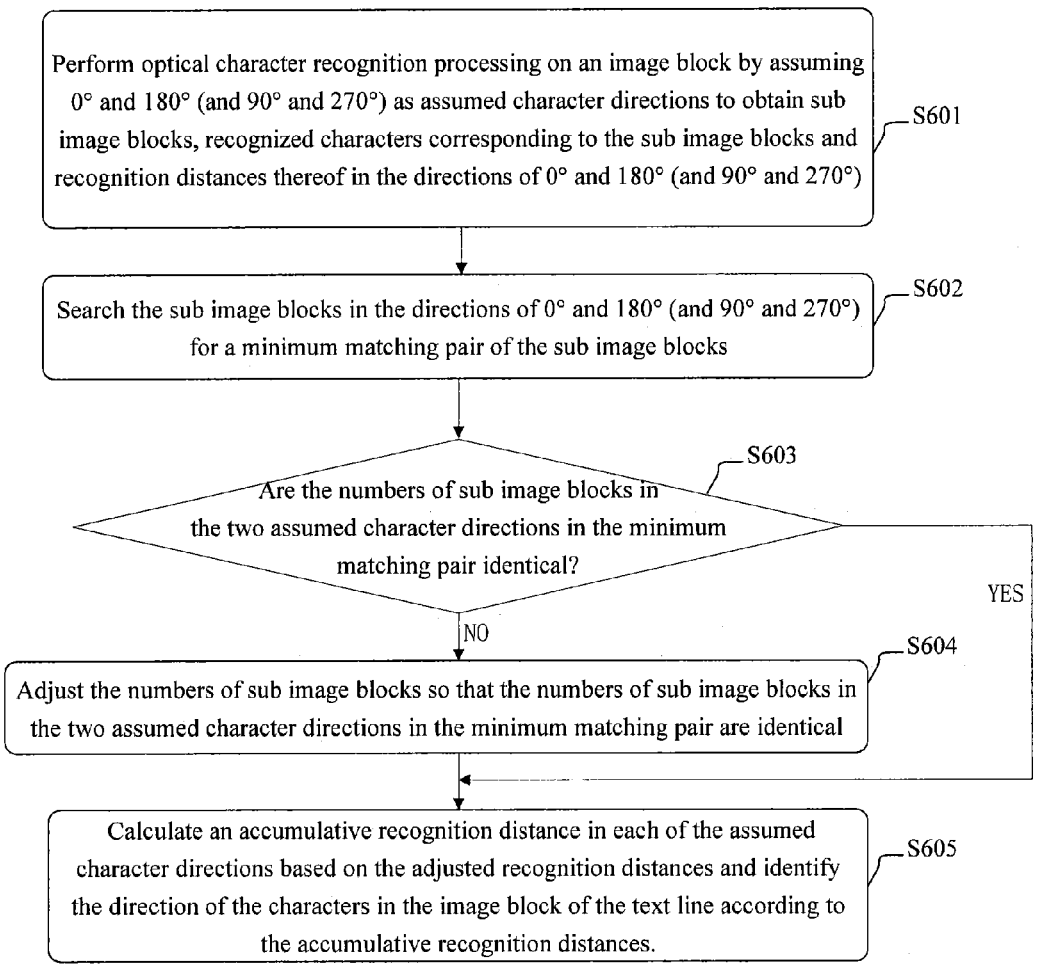
FIG. 6 illustrates a flow chart of a method of identifying the direction of characters in an image block according to a fourth embodiment.

The third and fourth embodiments will be described below with reference to FIG. 2, FIG. 5 and FIG. 6.

As described above, a recognition result of OCR generally includes divided-into sub image blocks, recognized characters corresponding to the sub image blocks and correctness measures of the recognized characters. A correctness measure reflects the reliability of a recognized character and is typically a confidence or a recognition distance. The description has been presented above in the first and second embodiments taking as an example a recognition result including a confidence. A description will be presented in the third and fourth embodiments with respect to the situation in which a recognition result includes a recognition distance. FIG. 2 illustrates an example of sub image blocks which are numbered, recognized characters and recognition distances in the directions of 0° and 180°.

Figure 2:
FIG. 2 illustrates sub image blocks, recognized characters and recognition distances in the directions of 0° and 180° resulting from OCR processing of an image block of a text line.
Figure 2:
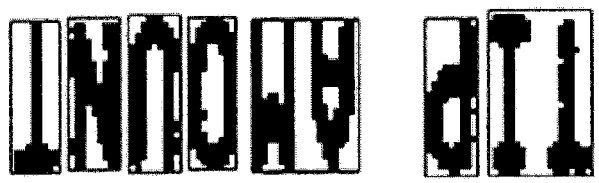

As illustrated in FIG. 2, the average recognition distance of the recognized characters in the 0° direction equals to (928+ 1279+1034+774+578+779+840+695)/8=863.4, and the average recognition distance of the recognized characters in the 180° direction equals to (759+840+704+769+1087+ 1005+790)/7=850.6, in the traditional method. Since 850.6 is smaller than 863.4, the 180° direction (i.e., the direction with a smaller average recognition distance) might be judged in error as the direction of the characters in the image block of the text line in the traditional method. Alike, this error arises from different results of dividing "AM" in the directions of 0° and 180°. There are eight resulting sub blocks in the 0° direction and seven resulting sub blocks in the 180° direction.

This problem arises because the image block is divided into different numbers of sub image blocks, and the method according to the embodiments can address the effect, on an identification result, of different numbers of sub image blocks, so the idea described in the first and second embodiments will also apply to a scenario in which an recognition result includes a recognition distance instead of a confidence.

A flow of a method of identifying the direction of characters in an image block according to the third embodiment will be described below with reference to FIG. 5. The method according to the third embodiment is similar to the method according to the first embodiment.

Firstly, OCR processing is performed by optical character recognition processing unit on an image block by assuming 0° and 180° as assumed character directions to obtain sub image blocks, recognized characters corresponding to the sub image blocks and recognition distances thereof in the directions of 0° and 180° (S501).

Next, the sub image blocks in the directions of 0° and 180° are searching by minimum matching pair searching unit for a minimum matching pair of the sub image blocks (S502). For example, P1 and N7 constitute a minimum matching pair in FIG. 1. Similarly, P2 and N6, P3 and P4 together with N5, P5 and N4, P6 and N3, P7 and N2, and P8 and N1 constitute respectively a minimum matching pair.

It is determined by sub image block correctness measure adjusting unit whether the numbers of sub image blocks in the two assumed character directions in the minimum matching pair are identical at S503. If so, then it indicates no inconsistent division has occurred and the flow goes to S505 for subsequent processing without any adjustment; otherwise, the flow goes to S504 of adjusting by sub image block correctness measure adjusting unit the recognition distances corresponding to the sub image blocks in the minimum matching pair.

The recognition distances corresponding to the sub image blocks in the minimum matching pair are adjusted in order to eliminate the effect, on an identification result, of different numbers of sub image blocks in the respective assumed character directions. There are numerous specific approaches. Here, several illustrative implementations thereof will be presented. It is assumed here M sub image blocks in one of the assumed character directions in the minimum matching pair correspond to N sub image blocks in the other assumed character direction in the minimum matching pair, where M and N are positive integers. As noted above, M=N indicates a correct division result of the sub image blocks and no adjustment is required. Therefore, the correctness measures corresponding to the sub image blocks will be adjusted only for the situation in which N≠N. In this embodiment, the correctness measure is a recognition distance.

In a first approach, the recognition distances of the M sub image blocks are multiplied by N, and the recognition distances of the N sub image blocks are multiplied by M.

In a second approach, each of the recognition distances of the M sub image blocks is multiplied by C/M, and each of the recognition distances of the N sub image blocks is multiplied by C/N, where C is the least common multiple of M and N.

In a third approach, each of the recognition distances of the M sub image blocks is divided by M, and each of the recognition distances of the N sub image blocks is divided by N.

In a fourth approach, the recognition distances of the M sub image blocks are multiplied by N/M.

After the recognition distances of the minimum matching pair which includes different numbers of sub image blocks in the sets of sub image blocks in the two directions are adjusted by sub image block correctness measure adjusting unit at S504, the adjusted recognition distances are obtained, and the flow goes to S505 of calculating by accumulative correctness measure calculating unit an accumulative recognition distance in each of the assumed character directions based on the adjusted recognition distances and identifying by character direction identifying unit the direction of the characters in the image block of the text line according to the accumulative recognition distances.

An accumulative recognition distance is a correctness measure characterizing an identification result of the image block of the text line in a direction as a whole. The sum of recognition distances corresponding to all sub image blocks in an assumed character direction can be calculated as an accumulative recognition distance in that direction. Alternatively, the arithmetic average value of recognition distances corresponding to all sub image blocks in an assumed character direction can be calculated as an accumulative recognition distance in that direction. A direction with a shorter accumulative recognition distance is more likely to be a correct identification result.

For an accumulative recognition distance which is the calculated sum of recognition distances, the recognition distances in the direction with a smaller number of sub image blocks are increased or the recognition distances in the direction with a larger number of sub image blocks are decreased so that the accumulative recognition distances in the two directions (the sums of the recognition distances in the respective directions) have higher reliability. For an accumulative recognition distance which is the calculated average of recognition distances, the sum of recognition distances which is the numerator is equivalently adjusted, and apparently if there are different denominators to calculate the accumulative recognition distances in the two directions, then the different denominators still reflect the different numbers of sub image blocks in the respective assumed character directions and thereby bring a negative influence upon an identification result. Therefore, in the third embodiment a consistent denominator shall be kept to calculate the arithmetic average value of recognition distances as an accumulative recognition distance. The number of unadjusted sub image blocks in any direction can be taken, e.g., 7 or 8 in the example as illustrated in FIG. 2. Preferably, the number of minimum matching pairs in an assumed character direction is taken, which physically means that sets of sub image blocks in a minimum matching pair are taken as an elementary unit of a result of dividing the image block of the text line and the apparent recognition distances of the two sets of sub image blocks as a whole in the minimum matching pair are adjusted. Apparently, it is preferable here to take the number of minimum matching pairs as the denominator to calculate the average of recognition distances.

Apparently, the one with the shorter accumulative recognition distance among the respective assumed character directions shall be judged as the direction of a correct identification result.

With the recognition distance adjusted according to the above mentioned first approach to fourth approach, the accumulative recognition distance in the direction of 0° is always longer than the accumulative recognition distance in the direction of 180°. Thus, a correct identification result can be derived.

A flow of a method of identifying the direction of characters in an image block according to the fourth embodiment will be described below with reference to FIG. 6.

S601 to S603 and S605 are the same respectively as S501 to S503 and S505 of the third embodiment above, and therefore a repeated description thereof will be omitted here. A major difference of the fourth embodiment from the third embodiment lies in that the numbers of sub image blocks in the two sets of sub image blocks in the minimum matching pair are adjusted so that the numbers of sub image blocks in the two sets of sub image blocks are identical.

At S604, the numbers of sub image blocks in the minimum matching pair are adjusted by sub image block number adjusting unit in order to eliminate the effect, on an identification result, of different numbers of sub image blocks in the respective assumed character directions. There are numerous specific approaches. Here, several illustrative implementations thereof will be presented. It is assumed here that M sub image blocks in one of the assumed character directions in the minimum matching pair correspond to N sub image blocks in the other assumed character direction in the minimum matching pair, where M and N are positive integers. As noted above, M=N indicates a correct division result of the sub image blocks and no adjustment is required. Therefore, the correctness measures corresponding to the sub image blocks will be adjusted only for the situation in which M≠N. In this embodiment, the correctness measure is a recognition distance.

In a first approach, each of the M sub image blocks is duplicated into N ones, and each of the N sub image blocks is duplicated into M ones.

It shall be noted that duplication means that each sub image block to be duplicated is duplicated M or N times into M or N identical duplicated sub image blocks without changing the recognition distances of the duplicated sub image blocks. Moreover, duplication here is primarily for the purpose of judging a correct character direction but does not means occurrence of a plurality of identical duplicated characters among the recognized characters corresponding to the text line.

In a second approach, each of the M sub image blocks is duplicated into C/M ones, and each of the N sub image blocks is duplicated into C/N ones, where C is the least common multiple of M and N.

In a third approach, the M sub image blocks are merged into N new sub image blocks, and the sum of the recognition distances of the N new sub image blocks is the sum of the recognition distances of the M sub image blocks multiplied by N/M.

The third approach will not be limited to any specific implementation. For example, assuming M>N, then (M−N+1) immediately adjacent sub image blocks among the M sub image blocks can be merged into a new sub image block without changing the remaining (N−1) sub image blocks themselves, and the recognition distances of the respective resulting N sub image blocks can be set to the average value of the recognition distances of the original M sub image blocks. Apparently, other sub image block merging approaches and other recognition distance adjusting approaches can alternatively be adopted so long as such two conditions are satisfied that "the M sub image blocks are merged into N new sub image blocks" and "the sum of the recognition distances of the N new sub image blocks is the sum of the recognition distances of the M sub image blocks multiplied by N/M". The new N sub image blocks satisfying the two conditions are consistent with the corresponding assumed character direction in terms of the number of sub image blocks and possess adjusted recognition distances with better comparability. Thus, there is no incorrect judgment of the direction of the text line due to inconsistent division results.

In a fourth approach, the M sub image blocks are merged into a new sub image block with a recognition distance being the arithmetic average value of the recognition distances of the M sub image blocks; and the N sub image blocks are merged into another new sub image block with a recognition distance being the arithmetic average value of the recognition distances of the N sub image blocks.

At S604, the effect, on an identification result, of different numbers of sub image blocks in the respective assumed character directions is eliminated by performing duplicating or merging in order for the same number of sub image blocks in the two directions in the minimum matching pair, so that the recognition distances in the two directions have better comparability in all the first to fourth approaches. For an accumulative recognition distance which is the calculated sum of recognition distances, duplicating or merging is performed so that the accumulative recognition distances in the two directions (the sums of the recognition distances in the respective directions) have higher reliability. For an accumulative recognition distance which is the calculated average of recognition distances, the sum of recognition distances which is the numerator is equivalently adjusted, and further to the third embodiment, the numbers of sub image blocks are also adjusted to be consistent, so each of the numbers of the adjusted sub image blocks can be taken as the denominator to calculate the average of recognition distances. Alike, the number of minimum matching pairs in an assumed character direction can also be taken as the denominator. Similarly, the one with the smallest accumulative recognition distance among the assumed character directions shall be judged as the direction of a correct identification result.

Figure 7:
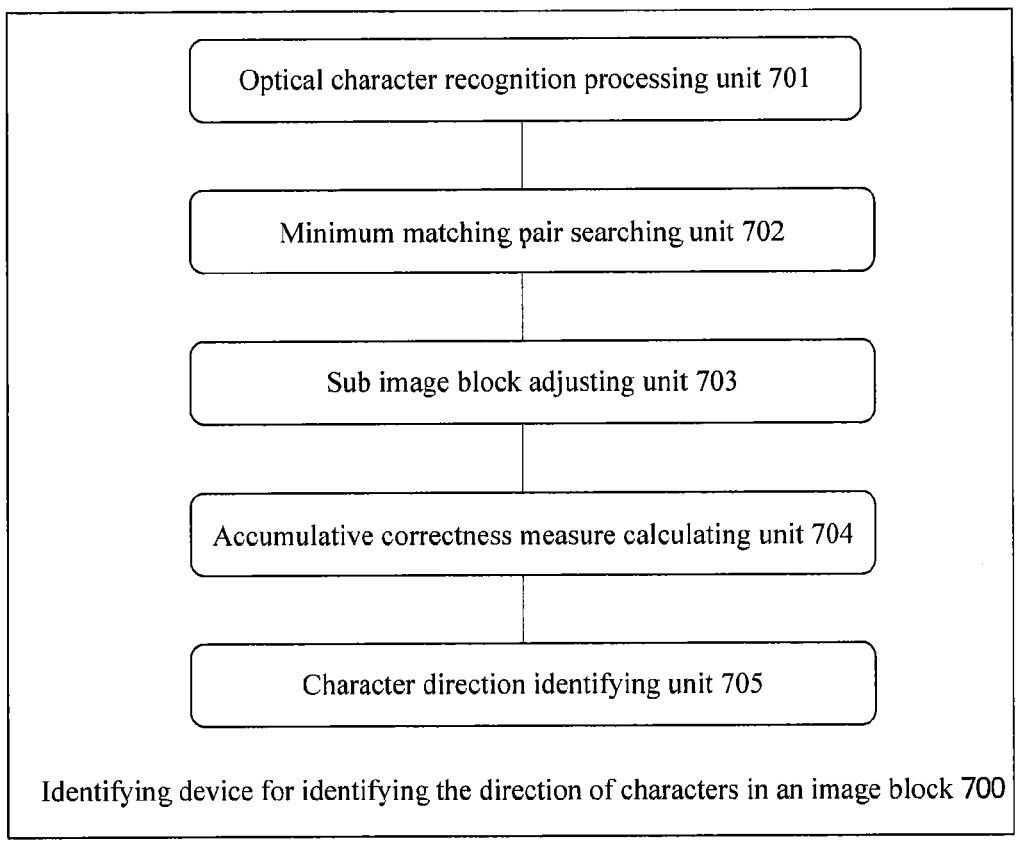
FIG. 7 illustrates a structural block diagram of a device for identifying the direction of characters in an image block according to an embodiment.

A structure of an identifying device for identifying the direction of characters in an image block according to an embodiment will be described below with reference to FIG. 7. As illustrated in FIG. 7, the identifying device 700 for identifying the direction of characters in an image block includes: an optical character recognition processing unit 701 configured for performing optical character recognition processing on the image block by assuming various directions as assumed character directions, respectively, to obtain sub image blocks, recognized characters corresponding to the sub image blocks and correctness measures thereof in each of the assumed character directions; a minimum matching pair searching unit 702 configured for, in sub image blocks in the assumed character directions with a 180° mutual relation therebetween, searching for a minimum matching pair of the sub image blocks, wherein the minimum matching pair is two sets of sub image blocks in the assumed character directions with a 180° mutual relation therebetween, which have corresponding positions, identical sizes and a minimum number of sub image blocks; a sub image block adjusting unit 703 configured for adjusting the sub image blocks in the searched minimum matching pair, to eliminate the effect, on an identification result, of different numbers of sub image blocks in the various assumed character directions; an accumulative correctness measure calculating unit 704 configured for calculating an accumulative correctness measure in each of the assumed character directions based on the adjusted sub image blocks; and a character direction identifying unit 705 configured for identifying the direction of the characters in the image block according to the accumulative correctness measures.

Since processing in the optical character recognition processing unit 701, the minimum matching pair searching unit 702, the sub image block adjusting unit 703, the accumulative correctness measure calculating unit 704 and the character direction identifying unit 705 included in the identifying device 700 according to the embodiments is similar respectively to processing at S301-S305, S401-S405, S501-S505 and S601-S605 of the method for identifying the direction of characters in an image block described above, a detailed description of these units will be omitted here for the sake of conciseness.

Furthermore, it shall be noted that the respective constituent modules and units in the foregoing device can be configured in software, firmware, hardware or a combination thereof. Specific configuration means or approaches are well known to those skilled in the art, and a repeated description thereof will be omitted here. In the case of being implemented in software or firmware, a program constituting the software is installed from the storage medium or network to a computer with a dedicated hardware structure (e.g., a general-purpose computer 800 illustrated in FIG. 8, etc.), which can perform various functions when various programs are installed thereon.

Figure 8:
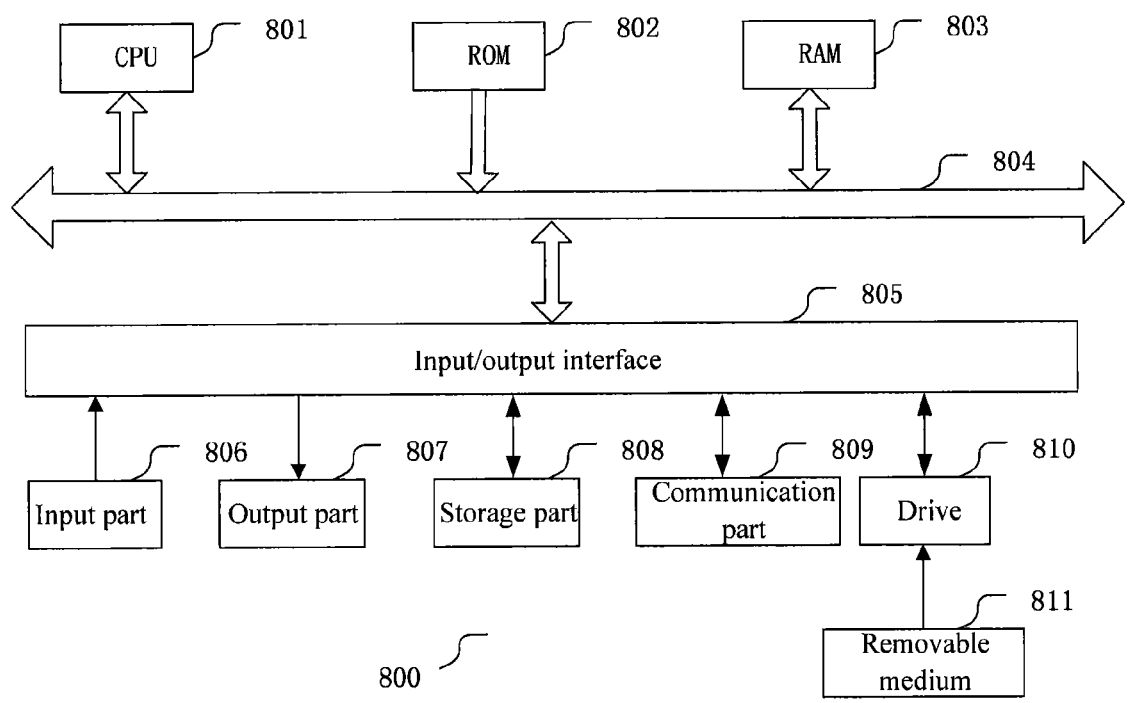
FIG. 8 illustrates a schematic block diagram of a computer that can be used for implementing the method and device according to the embodiments.

In FIG. 8, a Central Processing Unit (CPU) 801 performs various processes according to a program stored in a Read Only Memory (ROM) 802 or loaded from a storage part 808 into a Random Access Memory (RAM) 803 in which data required when the CPU 801 performs the various processes is also stored as needed. The CPU 801, the ROM 802 and the RAM 803 are connected to each other via a bus 804 to which an input/output interface 805 is also connected.

The following components are connected to the input/output interface 805: an input part 806 (including a keyboard, a mouse, etc.; an output part 807 including a display, e.g., a Cathode Ray Tube (CRT), a Liquid Crystal Display (LCD), etc., a speaker, etc.), a storage part 808 (including a hard disk, etc.) and a communication part 809 (including a network interface card, e.g., an LAN card, a modem, etc.) The communication part 809 performs a communication process over a network, e.g., the Internet. A drive 810 is also connected to the input/output interface 805 as needed. A removable medium 811, e.g., a magnetic disk, an optical disk, an optic-magnetic disk, a semiconductor memory, etc., can be installed on the drive 810 as needed so that a computer program fetched therefrom can be installed into the storage part 808 as needed.

In the case that the foregoing series of processes are implemented by software, a program constituting the software is installed from the network, e.g., the Internet, etc., or a storage medium, e.g., the removable medium 811, etc.

Those skilled in the art shall appreciate that such a storage medium will not be limited to the removable medium 811 illustrated in FIG. 8 in which the program is stored and which is distributed separately from the device to provide a user with the program. Examples of the removable medium 811 include a magnetic disk (including a Floppy Disk (a registered trademark)), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively, the storage medium can be the ROM 802, the hard disk included in the storage part 808, etc., in which the program is stored and which is distributed together with the device including the same to the user.

Furthermore, the embodiments further propose a program product including machine readable instruction codes which can perform the foregoing method according to the embodiments when being read and executed by a machine.

Correspondingly, a storage medium on which the program product including machine readable instruction codes is embodied will also be encompassed in the disclosure. The storage medium includes but will not be limited to a floppy disk, an optical disk, an optic-magnetic disk, a memory card, a memory stick, etc.

In the foregoing description of the embodiments, a feature described and/or illustrated in an embodiment can be used identically or similarly in one or more other embodiments in combination with or in place of a feature in the other embodiment(s).

It shall be noted that the terms "include/comprise" and their variants as used in this context refer to presence of a feature, an element, a step or a component but do not preclude presence or addition of one or more other features, elements, steps or components.

Furthermore, the method according to the embodiments will not be limited to being performed in the temporal sequence described in the specification but can also be performed in other temporal sequences, concurrently or separately. Therefore, the sequence in which the method is performed described in the specification will not limit the scope of the embodiments.

Although the embodiments have been disclosed above in the description of the embodiments, it shall be appreciated that all the foregoing embodiments and examples are illustrative but not limitative. Those skilled in the art can devise various modifications, adaptations or equivalents to the embodiments without departing from the spirit and scope of the appended claims. These modifications, adaptations or equivalents shall also be construed as coming into the scope of the embodiments.

The invention claimed is:

1. A method of identifying a direction of characters in an image block, comprising:
   performing optical character recognition processing on the image block by assuming various directions as assumed character directions, respectively, to obtain sub image blocks, recognized characters corresponding to the sub image blocks and correctness measures in each of the assumed character directions;
   in sub image blocks in the assumed character directions with a 180° mutual relation therebetween, searching for a minimum matching pair of the sub image blocks, wherein the minimum matching pair is two sets of sub image blocks in the assumed character directions with a 180° mutual relation therebetween, which have corresponding positions, identical sizes and a minimum number of sub image blocks;
   adjusting the sub image blocks in the searched minimum matching pair, to eliminate an effect, on an identification result, of different numbers of sub image blocks in the assumed character directions;
   calculating an accumulative correctness measure in each of the assumed character directions based on adjusted sub image blocks; and
   identifying the direction of the characters in the image block according to the accumulative correctness measures.

2. The method according to claim 1, wherein the adjusting the sub image blocks in the searched minimum matching pair comprises:
   when M sub image blocks in a assumed character direction in a minimum matching pair correspond to N sub image blocks in another assumed character directions in the minimum matching pair and M≠N, adjusting the correctness measures corresponding to the sub image blocks, wherein M and N are positive integers.

3. The method according to claim 1, wherein the adjusting the sub image blocks in the searched minimum matching pair comprises:
   when M sub image blocks in a assumed character direction in a minimum matching pair correspond to N sub image blocks in another assumed character directions in the minimum matching pair and M≠N, adjusting the number of sub image blocks so that the numbers of sub image blocks in the two assumed character directions in the minimum matching pair are identical, wherein M and N are positive integers.

4. The method according to claim 2, wherein the adjusting the correctness measures corresponding to the sub image blocks comprises:
   multiplying the correctness measures of the M sub image blocks by C/M, and multiplying the correctness measures of the N sub image blocks by C/N, wherein C is a least common multiple of M and N; or, multiplying the correctness measures of the M sub image blocks by N, and multiplying the correctness measures of the N sub image blocks by M.

5. The method according to claim 2, wherein the adjusting the correctness measures corresponding to the sub image blocks comprises:
   dividing the correctness measures of the M sub image blocks by M, and dividing the correctness measures of the N sub image blocks by N.

6. The method according to claim 2, wherein the adjusting the correctness measures corresponding to the sub image blocks comprises:
   multiplying the correctness measures of the M sub image blocks by N/M.

7. The method according to claim 3, wherein the step of adjusting the number of sub image blocks so that the numbers of sub image blocks in the two assumed character directions in the minimum matching pair are identical comprises: duplicating each of the M sub image blocks into C/M image blocks, and duplicating each of the N sub image blocks into C/N ones, where C is the least common multiple of M and N; or, duplicating each of the M sub image blocks into N image blocks, and duplicating each of the N sub image blocks into M ones.

8. The method according to claim 3, wherein the adjusting the number of sub image blocks so that numbers of sub image blocks in the two assumed character directions in the minimum matching pair are identical comprises: merging the M sub image blocks into N new sub image blocks, wherein a sum of correctness measures of the N new sub image blocks is a sum of correctness measures of the M sub image blocks multiplied by N/M.

9. The method according to claim 3, wherein the adjusting the number of sub image blocks so that the numbers of sub image blocks in the two assumed character directions in the minimum matching pair are identical comprises: merging the M sub image blocks into a new sub image block, wherein a correctness measure of the new sub image block is an arithmetic average value of the correctness measures of the M sub image blocks; and, merging the N sub image blocks into another new sub image block, wherein a correctness measure of the another new sub image block is an arithmetic average value of the correctness measures of the N sub image blocks.

10. The method according to claim 1, wherein the calculating an accumulative correctness measure in each of the assumed character directions based on the adjusted sub image blocks comprises: dividing sums of correctness measures of the adjusted sub image blocks in each of the assumed character directions by a number of the minimum matching pairs in the corresponding assumed character directions as the accumulative correctness measures in the corresponding assumed character directions.

11. The method according to claim 1, wherein the correctness measure comprises one of a confidence and a recognition distance, and the various directions comprise two transverse directions and two longitudinal directions of the image block.

12. A device for identifying the direction of characters in an image block, comprising:
   an optical character recognition processing unit configured for performing optical character recognition processing on the image block by assuming various directions as assumed character directions, respectively, to obtain sub image blocks, recognized characters corresponding to the sub image blocks and correctness measures thereof in each of the assumed character directions;

a minimum matching pair searching unit configured for, in sub image blocks in the assumed character directions with a 180° mutual relation therebetween, searching for a minimum matching pair of the sub image blocks, wherein the minimum matching pair is two sets of sub image blocks in the assumed character directions with a 180° mutual relation therebetween, which have corresponding positions, identical sizes and a minimum number of sub image blocks;

a sub image block adjusting unit configured for adjusting the sub image blocks in the searched minimum matching pair, to eliminate the effect, on an identification result, of different numbers of sub image blocks in the various assumed character directions;

an accumulative correctness measure calculating unit configured for calculating an accumulative correctness measure in each of the assumed character directions based on the adjusted sub image blocks; and a character direction identifying unit configured for identifying a direction of the characters in the image block according to the accumulative correctness measures.

13. The device according to claim 12, wherein the sub image block adjusting unit comprises:

a sub image block correctness measure adjusting unit configured for, when M sub image blocks in a assumed character direction in a minimum matching pair correspond to N sub image blocks in another assumed character direction in the minimum matching pair and M≠N, adjusting the correctness measures corresponding to the sub image blocks, wherein M and N are positive integers.

14. The device according to claim 12, wherein the sub image block adjusting unit comprises:

a sub image block number adjusting unit configured for, when M sub image blocks in a assumed character direction in a minimum matching pair correspond to N sub image blocks in another assumed character direction in the minimum matching pair and M≠N, adjusting the number of sub image blocks so that the numbers of sub image blocks in the two assumed character directions in the minimum matching pair are identical, wherein M and N are positive integers.

15. The device according to claim 12, wherein the accumulative correctness measure calculating unit is configured for dividing sums of the correctness measures of the adjusted sub image blocks in each of the assumed character directions by a number of the minimum matching pairs in the corresponding assumed character directions as the accumulative correctness measures in the corresponding assumed character directions.

* * * * *